INVENTOR
EDWIN J. SLOBODZINSKI
BY Joseph C. Redmond, Jr.
ATTORNEY

Sept. 7, 1965 E. J. SLOBODZINSKI 3,205,371

TWO TERMINAL DEVICE SWITCHING CIRCUIT EMPLOYING A SINGLE CLOCK

Filed Jan. 2, 1962 2 Sheets-Sheet 2

3,205,371

TWO TERMINAL DEVICE SWITCHING CIRCUIT EMPLOYING A SINGLE CLOCK

Edwin J. Slobodzinski, Wappingers Falls, N.Y., assignor to International Business Machines Corporation, New York, N.Y., a corporation of New York Filed Jan. 2, 1962, Ser. No. 163,812
11 Claims. (Cl. 307—88.5)

This invention relates to switching circuits, and more particularly, to switching circuits employing devices having bilateral characteristics.

Switching circuits may employ two or three terminal devices in performing a logical decision. Two terminal devices, typically tunnel diodes and phase locked oscillators, have advantages of speed, compactness and simplicity as compared to three terminal devices, typically transistors. Since input and output circuits are not separated in a two terminal device, as in the case of a three terminal device, switching decisions are simultaneously transmitted bilaterally or in the input and output directions. Manifestly, switching circuits immediately preceding and subsequent to a switching circuit will be altered by the output information so that information flow through a serial array of such switching circuits does not proceed unilaterally. Clocking successive switching circuits off and on, respectively, however, enables information flow to proceed unilaterally in a serial array of such switching circuits. Clocking signals, however, are expensive due to demands on timing and wave shape. The necessity for a plurality of clocking signals renders switching circuits employing two terminal devices more expensive than circuits employing three terminal devices. It is desirable, therefore, to improve the operation of switching circuits employing two terminal switching devices so that the inherent advantages of speed, compactness and simplicity may be fully utilized in computers and like apparatus.

A general object of the present invention is an improved switching system employing two terminal switching elements without the requirement of an expensive clocking arrangement.

One object is a plurality of two terminal switching devices arranged in a switching system and requiring a single clock.

Another object is a switching circuit employing two terminal devices and adapted to transmit information in a unilateral direction.

Another object is a switching circuit employing two terminal devices and adapted to have logic flexibility, compactness and simplicity.

Still another object is a switching circuit of two terminal devices suitable for either synchronous or asynchronous operation.

These and other objects are accomplished in accordance with the present invention, one illustrative embodiment of which comprises first and second bistable semiconductor devices connected at one end through suitable impedance means to first and second biasing supplies, respectively, so that the devices are arranged for either high voltage or low voltage operation. The other end of the first bistable device is connected to a clock source, which is in turn connected to the one end of the second bistable device. The other end of the second bistable device is connected to a source of reference potential, typically ground. Coupling means, typically a resistance-capacitance circuit and an asymmetrical conducting device, interconnect corresponding terminals of the bistable devices. A Kirchoff Adder circuit, typically a plurality of diodes, is connected as an input to the first bistable device. When the clock source is down, the first device is rendered bistable whereas the second device is cut off. Contrariwise, the up condition of the clock source turns off the first bistable device and simultaneously renders the second device bistable. Also, the resistance-capacitance circuit charges toward the level of the biasing source when the clock is up since the bistable device is nonconducting. Any input signal to the circuit is supplied during the clock transition to the down condition. On the down condition of the clock source the first device is rendered bistable and the second bistable device turns off. The resistance-capacitance circuit falls toward the low or high voltage appearing across the first bistable device. When the up condition of the clock returns, the voltage change across the resistance-capacitance or coupling circuit, in returning to the charged condition, is supplied to the second bistable device as an input signal, the magnitude of the change being dependent on the previous history of the first bistable device. For no input signal, the first bistable device operates in a low voltage state and the voltage change is large as compared to the voltage change when the first bistable device is switched to the high voltage state as a result of an input pulse. The second bistable device will change from a low voltage condition to a high voltage condition only in the event the first bistable device has not received an input signal. The output signal provided by the second bistable device does not affect the first bistable device since that device and the Kirchoff Adder diodes are turned off by the clock pulse. The output voltage from the second bistable device is either switched to a second or high voltage condition for no input signal or remains in the first or low voltage condition for an input signal. The single clock source permits information to proceed through the circuit in a unilateral direction. The absence of a plurality of clock signals to control the information flow in the circuit permits asynchronous or synchronous operation thereof.

A feature of the present invention is a clock source that alternately orders a pair of two terminal switching devices in bistable conducting states so that information flow therethrough may proceed in a unilateral direction.

Another feature is a pair of two terminal devices in combination with coupling means for memorizing information states and transmitting signals between the devices in proper time relation with respect to a clock source.

Another feature is a pair of two terminal devices, a clock source and a Kirchoff Adder connected together so that an input signal at one of two levels produces an output signal at the other level.

Another feature is a pair of bistable semiconductor devices, each device having two different operating voltages, at least two supply voltages of different magnitudes, coupling means interconnecting the devices and a clock source having two levels corresponding to the respective supply voltages whereby output signals from one device to the other have a magnitude equal to the differences between one supply voltage and the operating voltages of the one device.

Another feature is a bistable semiconductor device arranged to perform a NOR function whereby the device is set during one condition of a clock and reset during the next condition of the clock so that the output appears during the other condition of the clock.

The foregoing and other objects, features and advantages of the invention will be apparent from the following more particular description of a preferred embodiment of the invention as illustrated in the accompanying drawing.

Figure 1:
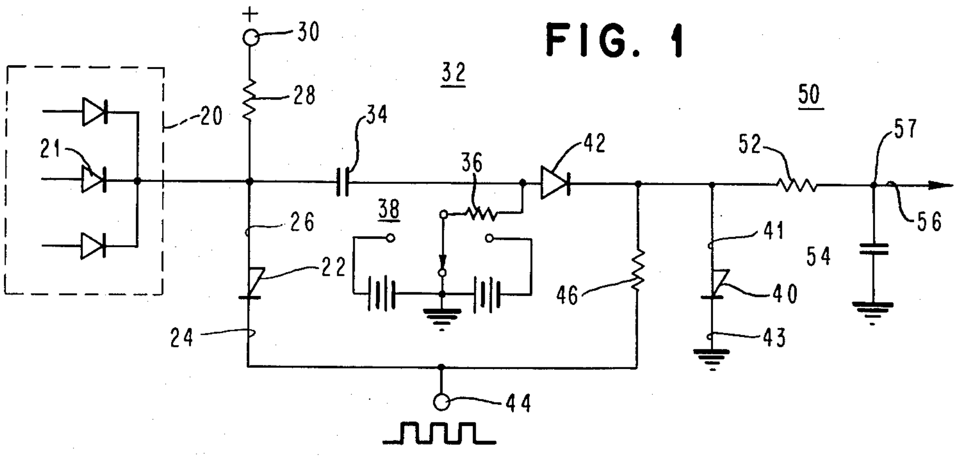
FIGURE 1 is an electrical schematic of one embodiment of the present invention.

Referring to FIGURE 1, one embodiment of the invention includes a gating circuit 20, typically a plurality of diodes 21, arranged in a well known logic circuit, for example, an AND or OR circuit. The OR gating circuit, as shown in FIGURE 1, is connected to a bistable semiconductor device 22. Bistable semiconductor devices are known to exist in several forms. One eminently satisfactory device that has been developed and may be advantageously employed in the present invention is described in an article entiled, "New Phenomenon in Narrow Germanium PN Junctions" by Leo Esaki, "Physical Review," volume 109, 1958, pages 603 and 604. The device described in the previously mentioned publication is commonly referred to as a tunnel or Esaki diode. It should be understood, of course, that there are other bistable devices which may be employed in the present invention with satisfactory results. Preferably, but not exclusively, the tunnel diode has been selected for the present invention due to the extreme speed of operation. The remaining paragraphs of the description will be limited to describing a circuit employing tunnel diodes.

The tunnel diode 22 includes a cathode 24 and an anode 26, the latter being connected to the input circuit 20 and also through a biasing resistor 28 to a first supply voltage 30. The anode 26 is also connected to a coupling circuit or differentiating circuit 32 including a capacitor 34 and a resistor 36, the former being returned to a second supply voltage 38, typically ground. The sensitivity of the circuit can be changed by selecting the proper supply voltage 38. The coupling circuit may exist in any of several forms, and should not be deemed to be limited to the present circuit. A resistance-capacitance arrangement was abitrarily selected for reasons of convenience in explanation. The resistance and capacitance values are chosen to satisfy speed and switching requirements.

A second tunnel diode 40 has an anode 41 and a cathode 43, the anode being connected through a diode 42 to a common junction 33 between the capacitor 34 and the resistor 36. The anode is also connected to an integrating circuit 50 including a resistor 52 and a capacitor 54, the latter being returned to ground. A clock source 44 is connected to the cathode 24 of the diode 22 and through a resistor 46 to the anode 41 of the diode 40. The cathode 43 of the diode 40 is connected to a source of reference potential, typically ground. Completing the circuit is a utilization circuit 56 which is connected to a common junction 57 between the resistor 52 and the capacitor 54.

Figure 2:
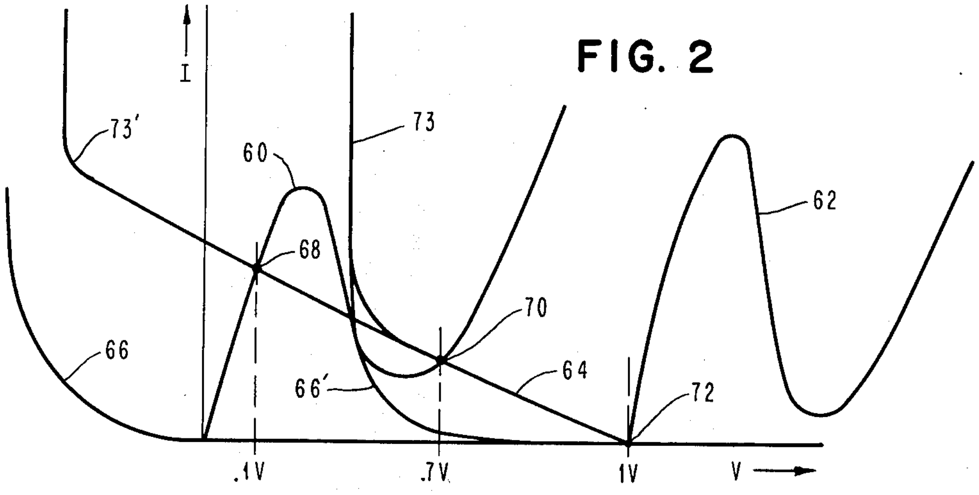
FIGURE 2 is a voltage-current graph of a bistable semiconductor device employed in the invention of FIGURE 1.
Figure 3:
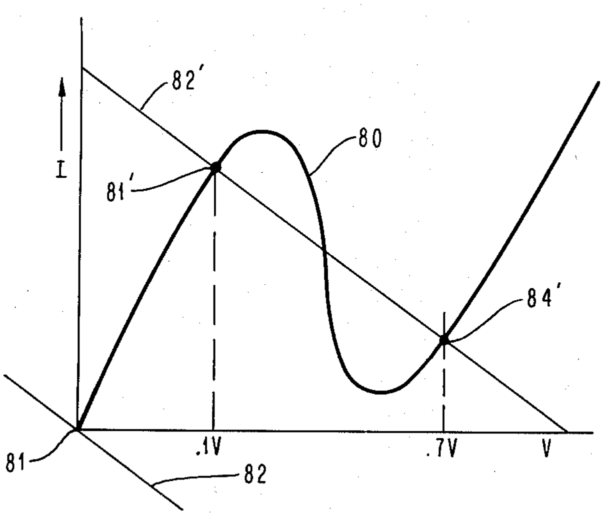
FIGURE 3 is a voltage-current graph of another bistable semiconductor device employed in the invention of FIGURE 1.

The operating characteristics for the tunnel diodes 22 and 40 are shown in FIGURES 2 and 3, respectively. Referring to FIGURE 2, the diode 22 has two operating characteristics 60 and 62 depending upon the absence or presence, respectively, of the clock pulse. A first load line 64 due to the resistor 28 is established. The input diodes 21 also establish a first load line 66 when an input signal is absent and a second load line 66' when an input is present. The resistor and diode load lines may be combined to form composite load lines 73 and 73' which will be described in more detail hereinafter. The intersection between the curves 73, 73' and 60 establish stable operating points 68 and 70, the former being at .1 v. or in the low voltage region of the diode and the latter being at .7 v. or in the high voltage region of the diode. When the clock pulse is present, zero voltage appears across the diode and no current flow occurs. Such a condition can be represented by the tunnel diode curve 60 being shifted to a new position 62 where the curve 62 intercepts the load line 64 at a voltage susbtantially equal to the supply voltage 30 (approximately 1 v.) and zero current. In the absence of an input signal and the presence of the clock signal, the diode will be at the operating point 72. On removal of the clock pulse, the diode curve 62 becomes congruent with the curve 60 and operation is established at the stable point 68. Restoration of the clock pulse results in a voltage change across the diode equal to the difference between the operating points 68 and 72. The difference is approprixmately equal to .9 v. when operation of the diode 22 shifts from the stable point 68 to the stable point 72.

An input present at the diodes 21 produces an effective load line as described by the composite curve 73. As the clock changes from the up condition to a down condition, the curve 62 becomes congruent with the curve 60. The input signal causes the load line 73 to have a single stable operating point 70 in the high voltage region of the diode. The return of the clock up condition causes the diode 22 to switch back to the operating point 72 and an output pulse equal to the difference between the operating voltages for the stable operating points 70 and 72 is applied to the diode 40. The difference between the operating voltages is of the order of .3 v. On the other hand, it will be recalled the absence of an input signal while the clock is up, causes the load line 73' to have two stable intersections 68 and 70. The device current during this interval is inadequate to place the diode 22 in the high voltage state. Thus, during the down clock transition the diode 22 remains in the low voltage state at an operating point 68. With return of the clock pulse, the diode switches back to the operating point 72 and a signal appears at the anode 26, which is the difference between the operating points 68 and 72. This difference is of the order of .9 v. Summarizing, therefore, it will be seen that an input signal to the diode 22 provides an output signal of nearly .3 v. whereas the absence of an input signal provides an output signal of nearly .9 v. The output signals, as will appear, hereinafter, are employed to operate the diode 40.

Referring to FIGURE 3, the diode 40 has an operating characteristic defined by a curve 80. A load line 82 is established for the diode 40 when the clock pulse is absent, the slope of the line being proportional to the magnitude of the resistor 46 (see FIGURE 1). Without the clock pulse, both the voltage across and current through the diode are zero and an operating point 81 is established. The appearance of a clock pulse elevates the load line 82 to a new position 82'. In the new position the load line 82' intersects the curve 80 at two points to establish stable operating points 81' and 84' in the low and high voltage regions, respectively, of the curve 80. The diode is able to operate at one or the other operating points depending upon the appearance of an input pulse of suitable magnitude. Normally, the diode operates at the point 81'.

It will be recalled that the diode 22 provides an output pulse of the order of .3 v. or .9 v. One or the other of these pulses is applied to the diode 40 at the same time the clock pulse is applied to the diode 40. The .3 v. pulse has insufficient magnitude, when combined with the clock pulse, to shift the operating point of the diode beyond the peak of the curve 80. The .3 v. pulse, in fact, does not forward bias the diode 42 (see FIGURE 1), so that little or no signal is applied to the diode 40 when the clock pulse is applied thereto. Accordingly, the current and voltage for the diode 40 climb toward those conditions indicated for the operating point 81' when the clock pulse is applied to the diode 40 and the diode 22 develops a .3 v. output signal.

A .9 v. output signal developed by the diode 22 and applied to the diode 40 when the clock signal appears causes the diode 40 to be switched to the high voltage region of the curve 80 and thereafter stabilize at the operating point 84'. The .9 v. pulse is sufficient to forward bias the diode 42 (see FIGURE 1), and increase the current through and the voltage across the diode 40 beyond the peak conditions of the curve 80 when the clock pulse appears. Accordingly, the diode is switched to the high voltage region and after termination of the .9 v. pulse stabilizes at the operating point 84', the other stable operating point for the diode. The diode 40 is returned from the operating point 81' or 84' when the clock pulse is removed. Summarizing, therefore, an output pulse from the diode 22 of the order .3 v. causes the diode 40 to assume a low voltage operating condition at the point 81'. An output pulse from the diode 22 of the order of .9 v., in contrast, causes the diode 40 to assume a high voltage operating condition at the point 84'.

Figure 4F:
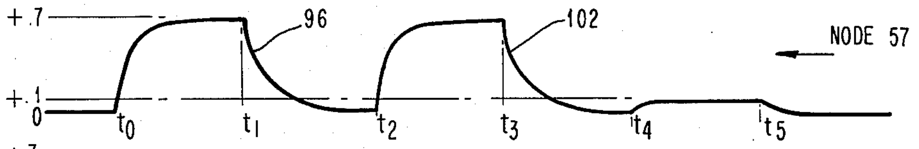
FIGURE 4F is a voltage-time graph of the output signal shown in 4E after passage through an integrating circuit.
Figure 4E:
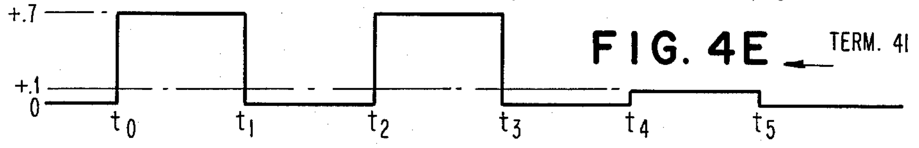
FIGURE 4E is a voltage-time graph of the output voltage from the bistable device of FIGURE 3.
Figure 4D:
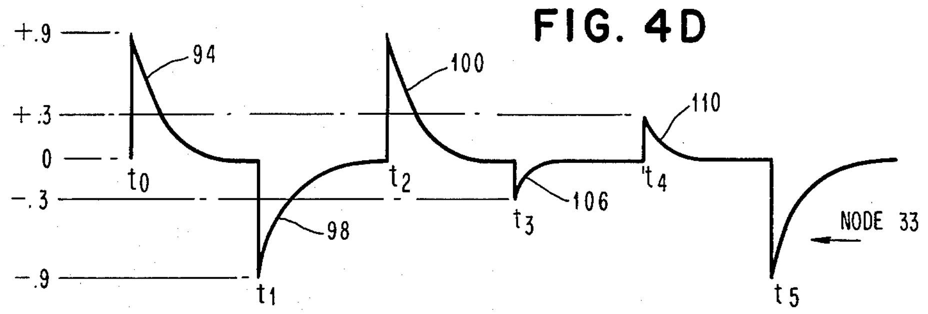
FIGURE 4D is a voltage-time graph of an input signal supplied to the other bistable device shown in FIGURE 1.
Figure 4C:
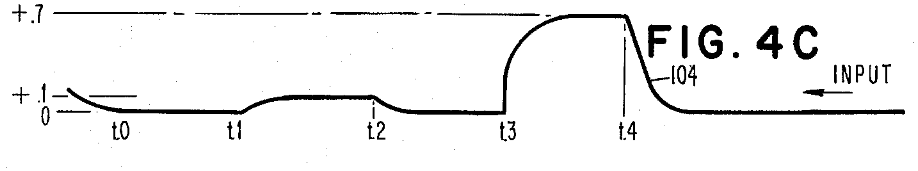
FIGURE 4C is a voltage-time graph of an input signal applied to the input of FIGURE 1.
Figure 4B:
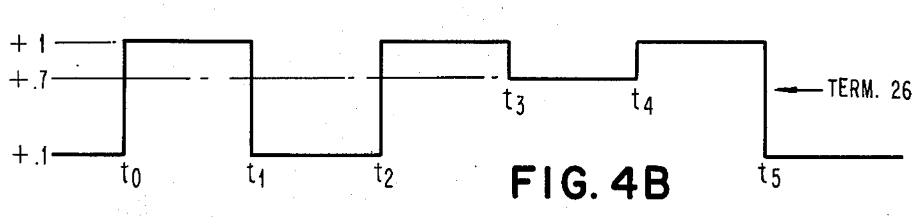
FIGURE 4B is a voltage-time graph of an output voltage from one bistable device shown in FIGURE 1.
Figure 4A:
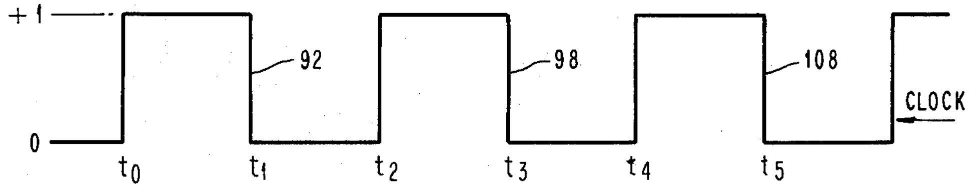
FIGURE 4A is a voltage-time graph of a clock signal supplied to the circuit of FIGURE 1.

Operation of the circuit will now be described in conjunction with FIGURES 1, 2 and 3, and the timing chart shown in FIGURES 4A through 4F. When a clock signal 92 is present, the resistance-capacitance circuit 32 charges to the potential of the supply voltage 30 as shown in FIGURE 4B during the time interval $T_0$ to $T_1$. In the absence of an input signal during this time interval, as shown in FIGURE 4C, the voltage at the node 33, as shown in FIGURE 4D, will have transmitted a spike 94 to the diode 40. The effect of the spike 94 will switch the diode 40 from a low voltage condition to a high voltage condition, as shown in FIGURE 4E. The integrating circuit 50 connected to the diode 40 will charge to produce an output pulse 96, as shown in FIGURE 4F. When the clock drops during the time interval $T_1$ to $T_2$, the voltage at the anode 26 will fall to that appearing across the diode 22, as shown in FIGURE 4B. An input signal can be received at this time since the input diodes 21 are forward biased, as shown in FIGURE 4C. The resistance-capacitance circuit 32 provides a negative spike 98 to the diode 40, as shown in FIGURE 4D. The diode is unaffected during the interval since the coupling diode is reverse biased. Accordingly, the diode 40 remains in the low voltage condition, as shown in FIGURE 4E, for the time interval $T_1$ to $T_2$ and the integrating circuit 50 discharges toward ground, as shown in FIGURE 4F. The next clock pulse 98 which occurs during the time interval $T_2$ to $T_3$, charges the resistance-capacitance circuit toward the potential level of the supply 30, as shown in FIGURE 4B. A positive spike 100 is transmitted to the diode 40, as shown in FIGURE 4D, the positive spike switching the diode to the high voltage condition, as shown in FIGURE 4E, to produce an output pulse 102, as shown in FIGURE 4F. In the event of an input pulse 104, during $T_3$ to $T_4$ the next interval, as shown in FIGURE 4C, the diode 22 will be switched to the high voltage condition as previously described. The voltage at the resistance-capacitance circuit 32 will not discharge to the same level as in the case when an input pulse is absent. The input pulse sets the diode 22 at operating point 70 or .7 v. The circuit 32, therefore, discharges from 1.0 v. to .7 v. which equals .3 v. In the absence of an input pulse, however, the voltage at the capacitor would have discharged to a .1 v. (corresponding to operating point 68 of the diode 22) and develop a .9 v. capacitor voltage differential at the node 33. A slight negative spike 106 is transmitted to the diode 40 during the time interval $T_3$ to $T_4$, the diode 40 being unaffected due to a reverse biased condition, as shown in FIGURE 4E. The next clock pulse 108, during the time interval $T_4$ to $T_5$, charges the capacitor to the supply voltage 30, as shown in FIGURE 4B. The change in voltage across the diode 22 is .3 v. A small positive spike 110 is transmitted to the diode 40, as shown in FIGURE 4D, the spike being insufficient to forward bias the diode 42 and thereby pass to the diode 40. As a result, the latter remains in the low voltage condition, as shown in FIGURE 4E, for the time interval $T_4$ to $T_5$, and no output pulse appears from the integrating circuit 50, as shown in FIGURE 4F. In the absence of an input pulse, during the interval $T_4$ to $T_5$, as shown in FIGURE 4C, the circuit operation is that described for the time interval $T_0$ through $T_2$. In the presence of an input signal, during the interval $T_4$ to $T_5$, the circuit operation is that described for the interval $T_3$ through $T_5$. For purposes of brevity, therefore, further description of the circuit operation is believed unnecessary.

Thus, the clock pulse turns off and on alternately the diodes 22 and 40, respectively. It will also be noted that an input signal operates the circuit to produce a low voltage output. The absence of an input signal, however, operates the circuit to produce a relatively high voltage output. Stated in other words, an up level at the input produces a down level at the output, and a down level at the input produces an up level at the output, the input and output signals being shifted by one clock cycle. Such operation describes the well known NOR function so that the present circuit may be employed in various logical configurations such as multivibrators or set and reset storage circuits and other well known computer circuitry.

The diode 22 provides inverted output signals with respect to the input signals. Normally, tunnel diodes operated as NOR type circuits are continuously conducting and the load line is varied to produce the different outputs. The present circuit, however, provides NOR type operation by varying the position of the diode characteristic with respect to the load line. Also, the diode is alternately rendered bistable and monostable instead of remaining continuously conducting as in the prior art circuit. Such operation enables the switching energy to be supplied by the clock source so that input signals of low amplitude and short duration may be employed to operate the circuit. Such a feature is especially desirable in computers and like apparatus.

The present invention, therefore, describes a switching circuit employing devices having bilateral switching characteristics wherein information flow through such a circuit is unilaterally due to the cooperation among the circuit elements and a clock source. The circuit also operates as a unique NOR circuit in that the input device is alternately biased on and off so that an input signal can be provided during the on condition and an output signal can be provided during the off condition. Since the circuit is solely dependent upon a single clock pulse, it is conveniently suitable for either asynchronous or synchronous operation. Additionally, the circuit requires a minimum number of elements of simple rugged construction so that the entire combination can be compact in construction and suitable for mass production techniques.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A logic circuit comprising first and second devices, each device having two regions in its operating range which exhibit a positive resistance and a region between them which exhibits a negative resistance, each device having at least first and second terminals, said devices adapted to receive input information and provide output information in translated form, means for coupling first terminals of the devices together, the second terminal of the second device connected to a reference potential, and a pulse source having a first and second terminal, the first terminal connected to the second terminal of the first device and to the first terminal of the second device, the second terminal of the pulse source connected to the reference potential, said pulse source controlling the translation of input information through the devices in a unilateral direction.

2. A logic circuit comprising
first and second devices, each device having two regions in its operating range which exhibit a positive resistance and a region between them which exhibits a negative resistance,
each device having at least first and second terminals, each device further adapted to have two stable operating conditions,
an input circuit connected to one device,
coupling means interconnecting first terminals of the devices,
the second terminal of the second device connected to a reference potential, and
a pulse source having first and second terminals, the first terminal connected to the second terminal of the first device and to the first terminal of the second device, the second terminal of the pulse source connected to the reference potential, said pulse source alternately ordering the devices into opposite stable operating conditions.

3. A logic circuit comprising
first and second bistable devices, each device having two regions in its operating range which exhibit a positive resistance and a region between them which exhibits a negative resistance,
said bistable devices having at least first and second terminals,
means for coupling together the first terminals of the bistable devices,
an output circuit connected to one bistable device,
a logic circuit connected to the first terminal of the other bistable device and through said coupling means to the first terminal of said one bistable device,
a pulse source having first and second terminals,
a reference potential connected to the first terminal of the pulse source and to the second terminal of the second bistable device, and
means connecting the second terminal of the pulse source to the second terminal of the first bistable device and to the first terminal of the other bistable device, whereby an input signal to the logic circuit at a first or a second voltage level will result in the second bistable device providing a voltage level to the output circuit which is the inverse of the voltage level of the input signals at the logic circuit.

4. A logic circuit comprising
first and second bistable semiconductor devices having high and low conducting conditions,
each device having at least first and second terminals,
an input circuit connected to the first terminal of the first bistable device,
an output circuit connected to the first terminal of the second bistable device,
a reference potential,
means connecting the second terminal of the second bitable device to the reference potential,
clock means having first and second terminals, said first terminal connected to the reference potential,
said second terminal connected to the second terminal of the first bistable device and to the first terminal of the second bistable device,
said clock means alternately placing each bistable device in the high conducting condition,
first means connected between the first terminal of the first bistable device and the reference potential,
said first means determining the voltage change across the first bistable device when the device changes from the low conducting to the high conducting condition, and
second means connected to the first means and to the first terminal of the second device for transmitting the voltage change to the other bistable device of the input signal.

5. The invention defined in claim 4 wherein the means for determining the voltage change across the first bistable device is an energy storage device, and the means for transmitting the voltage change to the other bistable device is a connection including an asymmetrical conducting device between the energy storage means and the second bistable device.

6. A logic circuit comprising
a reference potential,
first and second negative resistance devices having at least first and second terminals,
said devices being adapted to operate bistably,
an input circuit connected to the first device,
an output circuit connected to the second device,
a pulse source having first and second terminals, the first terminal connected to the reference potential, the second terminal connected to the second terminal of the first device and to the first terminal of the second device for successively and alternatively rendering each device nonconducting and thereafter bistable,
means connecting the second terminal of the second device to the reference potential,
second means connected to the first device for adapting the device when bistable to operate at either one of two different operating voltages according to the presence or the absence of input information,
a voltage detecting circuit connected between the first terminal of the first device and the reference potential,
said circuit recording the voltage differences between the operating voltage of the first device and the reference potential,
first and second voltage magnitudes appearing at the voltage detecting circuit for the presence and absence of input information, respectively, to the first device, and
third means connected between the voltage detecting circuit and the first terminal of the second device for transmitting one of the volage magnitudes to the second device when a first device is rendered nonconducting, said second device being adapted to provide a first output signal depending upon the presence of an input signal and a second output signal depending upon the absence of an input signal.

7. The circuit defined in claim 6 wherein the third means includes a device for inhibiting the transmission of the other voltage magnitude from the voltage detecting circuit to the second device.

8. A switching circuit comprising
first and second bistable semiconductor devices, each bistable device having a first and a second terminal,
coupling means interconnecting the first terminals,
the second terminal of the second device connected to a reference potential, and
a pulse source having first and second terminals, the first terminal connected to the reference potential and the second terminal connected to the second terminal of the first bistable device and to the first terminal of a second bistable device.

9. The switching circuit described in claim 8 wherein the coupling circuit comprises a differentiating circuit and an isolating device.

10. The switching circuit defined in claim 9 wherein the differentiating circuit is connected to a source of reference potential which may be varied to control the switching sensitivity of the circuit.

11. The switching circuit defined in claim 10 wherein the clock source has first and second voltage levels, the first voltage level rendering the second bistable device conducting and the first bistable device nonconducting, the second voltage level rendering the first bistable device conducting and the second bistable device nonconducting.

References Cited by the Examiner

UNITED STATES PATENTS

| | | | |
|---|---|---|---|
| 2,614,140 | 10/52 | Kreer | 307—88.5 |
| 2,944,164 | 7/60 | Odell et al. | 307—88.5 |
| 3,078,376 | 2/63 | Lewin | 307—88.5 |

OTHER REFERENCES

IBM Technical Disclosure Bulletin, vol. 4, No. 7, December 1961, page 56, "Gate" by M. Hilsenrath.

IBM Technical Disclosure Bulletin, vol. 2, No. 6, April 1960, page 102, "RC Coupled Tunnel Diode Shift Register."

ARTHUR GAUSS, *Primary Examiner.*

JOHN W. HUCKERT, *Examiner.*